United States Patent
Huang et al.

(10) Patent No.: US 10,833,990 B2
(45) Date of Patent: Nov. 10, 2020

(54) TRANSMITTING PACKET

(71) Applicant: NEW H3C TECHNOLOGIES CO., LTD., Hangzhou, Zhejiang (CN)

(72) Inventors: Liwei Huang, Beijing (CN); Wei Wang, Beijing (CN)

(73) Assignee: NEW H3C TECHNOLOGIES CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 16/463,917

(22) PCT Filed: Nov. 28, 2017

(86) PCT No.: PCT/CN2017/113249
§ 371 (c)(1),
(2) Date: May 24, 2019

(87) PCT Pub. No.: WO2018/099354
PCT Pub. Date: Jun. 7, 2018

(65) Prior Publication Data
US 2019/0297016 A1     Sep. 26, 2019

(30) Foreign Application Priority Data

Nov. 29, 2016   (CN) .......................... 2016 1 1076017

(51) Int. Cl.
*H04L 12/28* (2006.01)
*H04L 12/741* (2013.01)
(Continued)

(52) U.S. Cl.
CPC ............ *H04L 45/745* (2013.01); *H04L 45/66* (2013.01); *H04L 49/253* (2013.01); *H04L 49/45* (2013.01); *H04L 49/356* (2013.01); *H04L 49/70* (2013.01)

(58) Field of Classification Search
None
See application file for complete search history.

(56) References Cited

U.S. PATENT DOCUMENTS

2013/0094506 A1    4/2013  Song
2015/0078392 A1*   3/2015  Yan .......................... H04L 49/45
                                                        370/410
(Continued)

FOREIGN PATENT DOCUMENTS

CN    102281181 A    12/2011
CN    103401774 A    11/2013
(Continued)

OTHER PUBLICATIONS

ISA State Intellectual Property Office of the People's Republic of China, International Search Report Issued in Application No. PCT/CN2017/113249, dated Jan. 22, 2018, WIPO, 4 pages.
(Continued)

*Primary Examiner* — Phirin Sam
(74) *Attorney, Agent, or Firm* — Greenblum & Bernstein, P.L.C.

(57) ABSTRACT

Provided are a method and device for transmitting a packet. According to an example of the method, a Controlling Bridge (CB) device maintains a mapping entry representing a correspondence between a Port Extender (PEX) device and a Media Access Control (MAC) address of a host connected with the PEX device in a mapping table. The CB device receives a first data packet transmitted by a first PEX device, and determines a mapping entry in which the MAC address of the host matches a destination MAC address of the first data packet by querying the mapping table. Then, the CB device transmits the first data packet to a second PEX device in the mapping entry.

12 Claims, 4 Drawing Sheets

(51) Int. Cl.
*H04L 12/937* (2013.01)
*H04L 12/931* (2013.01)
*H04L 12/721* (2013.01)

(56) References Cited

U.S. PATENT DOCUMENTS

| | | | |
|---|---|---|---|
| 2015/0244629 A1* | 8/2015 | Sinha | H04L 47/18 370/236 |
| 2015/0271105 A1* | 9/2015 | Budhia | H04L 49/253 370/392 |
| 2016/0065463 A1 | 3/2016 | Wang et al. | |
| 2016/0162429 A1* | 6/2016 | Krishnamurthy | G06F 13/4022 710/300 |
| 2016/0205019 A1 | 7/2016 | Sundaram et al. | |
| 2016/0380924 A1* | 12/2016 | Sivasankar | H04L 43/12 370/419 |
| 2017/0034000 A1* | 2/2017 | Gopalarathnam | H04L 41/12 |
| 2017/0063668 A1* | 3/2017 | Sivasankar | H04L 45/18 |
| 2018/0316616 A1* | 11/2018 | Sinha | H04L 49/45 |

FOREIGN PATENT DOCUMENTS

| | | |
|---|---|---|
| CN | 103516609 A | 1/2014 |
| CN | 104301238 A | 1/2015 |
| CN | 104780067 A | 7/2015 |
| CN | 105471742 A | 4/2016 |
| WO | 2015192793 A1 | 12/2015 |

OTHER PUBLICATIONS

European Patent Office, Supplementary European Search Report Issued in Application No. 17877149.9, dated Jul. 30, 2019, Germany, 17 pages.
ISA State Intellectual Property Office of the People's Republic of China, Written Opinion of the International Searching Authority Issued in Application No. PCT/CN2017/113249, dated Jan. 22, 2018, WIPO, 4 pages.
State Intellectual Property Office of the People's Republic of China, Office Action and Search Report Issued in Application No. 201611076017.0, dated Oct. 31, 2019, 21 pages,(Submitted with Machine Translation).
European Patent Office, Extended European Search Report Issued in Application No. 17877149.9, dated Nov. 4, 2019, Germany, 15 pages.
State Intellectual Property Office of the People's Republic of China, Office Action and Search Report Issued in Application No. 2016110760170, dated Jun. 1, 2020, 22 pages, (Submitted with English Translation).
Japanese Patent Office, Office Action Issued in Application No. 2019-528754, dated Jun. 16, 2020, 10 pages. (Submitted with English Translation).

\* cited by examiner

TRANSMITTING PACKET

CROSS REFERENCE TO RELATED APPLICATION

The present application is a National Phase of International Application Number PCT/CN2017/113249, filed Nov. 28, 2017, and claims priority to Chinese Patent Application No. 201611076017.0 entitled "METHOD AND DEVICE FOR TRANSMITTING PACKET" filed on Nov. 29, 2016, the entire content of which is incorporated herein by reference.

BACKGROUND

In a longitudinally stacked network structure, a plurality of Port Extender (PEX) devices may be connected to a Controlling Bridge (CB) device. Each PEX device may be virtualized as a remote service board of the CB device and managed by the CB device. By using the stacking technique, increased interface density of a CB device, simplified network topology and reduced network maintenance cost all may be achieved.

A PEX device may directly transmit a packet to a CB device after receiving the packet from a host, and the CB device may then transmit the packet by using a forwarding entry. In the above process, the PEX device does not need to maintain any forwarding entry, and the PEX device may transmit all received packets to the CB device.

In the above manner, although the utilization of the PEX device is increased and the processing procedure of the PEX device is simplified, the CB device needs to maintain a large quantity of forwarding entries with vast entry resources occupied. What is more, the CB device needs to process a large quantity of packets with vast processing resources occupied and therefore a high requirement for the performance of the CB device is desired.

BRIEF DESCRIPTION OF THE DRAWINGS

To illustrate the technical solutions in examples of the present disclosure more clearly, the accompanying drawings required in descriptions of the examples of the present disclosure will be briefly introduced below. Apparently, the drawings in the following descriptions are just some examples contained in the present disclosure, and other drawings may also be obtained by those of ordinary skill in the art according to these drawings.

DETAILED DESCRIPTION OF THE EMBODIMENTS

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although various types of information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

Figure 1:
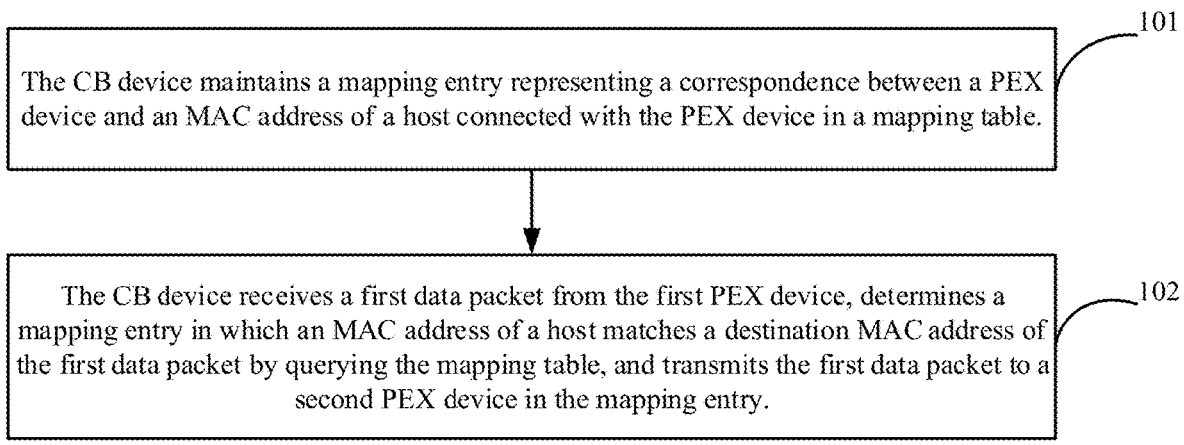
FIG. 1 illustrates a flow diagram of a method of transmitting a packet according to an example of the present disclosure.

In an example of the present disclosure, there is provided a method of transmitting a packet. The method may be applied to a longitudinally stacked network. In the network, a CB device and at least two PEX devices with each of them connected to the CB device may be included. FIG. 1 illustrates a flow diagram of a method of transmitting a packet, and the method may include the following blocks:

At block 101, the CB device may maintain a mapping entry representing a correspondence between a PEX device and a Media Access Control (MAC) address of a host connected with the PEX device in a mapping table (maintainable in a memory of the CB device without occupying the hardware resources of the CB device).

In an example, a CB device may maintain a mapping entry representing a correspondence between a PEX device and an MAC address of a host connected with the PEX device in a mapping table, which may specifically include: receiving, by the CB device, a protocol packet carrying the MAC address of the host learnt by the PEX device transmitted from the PEX device, and maintaining a correspondence between an identifier of a first PEX device and the MAC address as a mapping entry in the mapping table, where the identifier is assigned by the CB device for the first PEX device.

In an example, after learning the MAC address of the host, the PEX device may record a forwarding entry representing a correspondence between the MAC address of the host and a third interface in a forwarding table, where the third interface is an interface of the PEX device that is connected with the host. Then, the PEX device may generate a protocol packet including the MAC address and transmit the protocol packet to the CB device. After receiving the protocol packet, the CB device may record a correspondence between the identifier of the first PEX device and the MAC address as the mapping entry in the mapping table.

In an example, a host may initiatively transmit an Address Resolution Protocol (ARP) packet. When the host is connected to a PEX device, the ARP packet may be received by the PEX device. The PEX device may learn the MAC address of the host from the ARP packet, and the third interface is the interface of the PEX device that receives the ARP packet. Based on this, the PEX device may record the correspondence between the MAC address and the third interface in the forwarding table.

In the process that the CB device receives the protocol packet transmitted by the PEX device and records the correspondence between the MAC address and the identifier of the PEX device in the mapping table, since identifiers assigned by the CB device for different PEX devices are different, the CB device may determine an identifier of a PEX device after receiving the protocol packet from the PEX device, and then record the correspondence between the MAC address carried in the protocol packet and the identifier of the PEX device in the mapping table.

In an example, the CB device may also record a forwarding entry representing a correspondence between an identifier assigned for a PEX device and a first interface in the forwarding table, where the first interface may be an interface of the CB device that is connected with the PEX device. Furthermore, for each PEX device, the CB device may record a correspondence between the identifier of the PEX device and the first interface in the forwarding table (maintainable on a hardware chip of the CB device, and occupying less entry resources of the hardware chip because only one record is for each PEX device).

At block 102, the CB device may receive a first data packet transmitted from the first PEX device, determine a mapping entry in which an MAC address of a host matches a destination MAC address of the first data packet by querying the mapping table, and transmit the first data packet to a second PEX device in the mapping entry.

In an example, since the correspondence between the MAC address of the host connected with the PEX device and the identifier of the PEX device is recorded in the mapping table of the CB device, the CB device may determine the identifier of the PEX device corresponding to the destination MAC address of the first data packet when querying the mapping table through the destination MAC address.

In an example, the CB device may transmit the first data packet to the second PEX device, which specifically includes: querying, by the CB device, the forwarding table with the identifier of the second PEX device to determine the first interface corresponding to the identifier, and transmitting the first data packet via the first interface, so that the first data packet can be transmitted to the second PEX device corresponding to the identifier.

Since the correspondence between the identifier of the PEX device and the first interface is recorded in the forwarding table of the CB device, the CB device may determine the first interface corresponding to the identifier when querying the forwarding table with the identifier.

Figure 2:
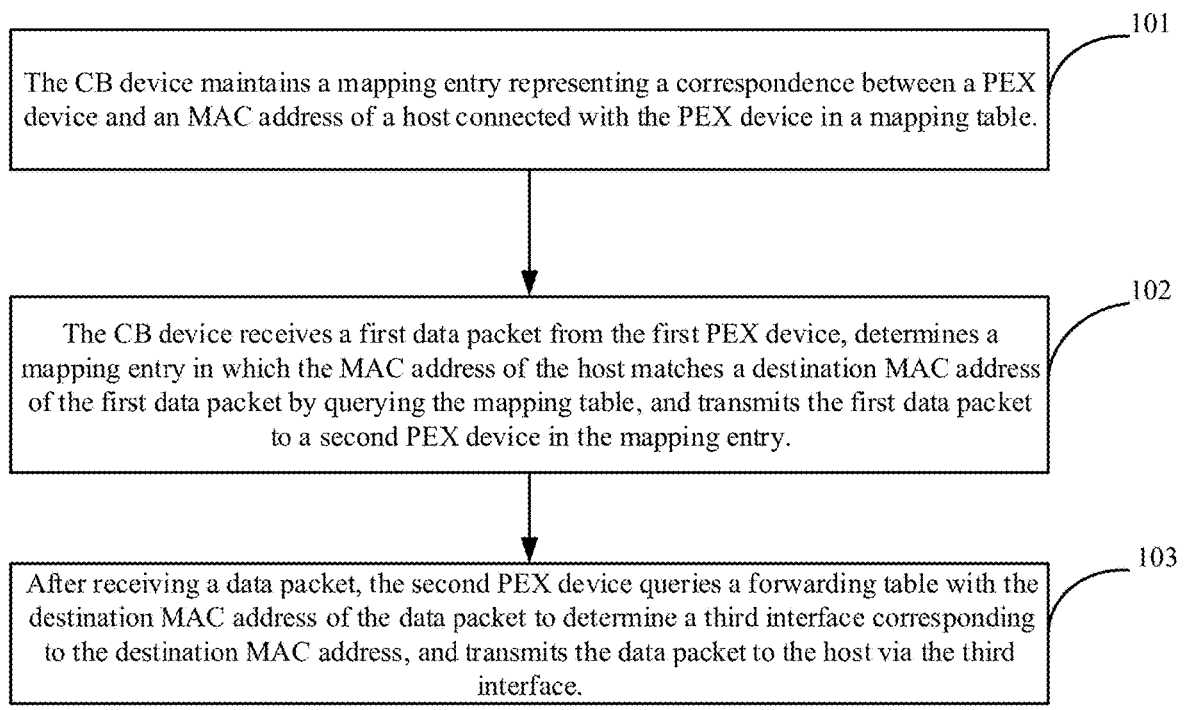
FIG. 2 illustrates a flow diagram of a method of transmitting a packet according to another example of the present disclosure.

Referring to FIG. 2, the method of transmitting a packet may also include block 103.

At block 103, after receiving a data packet, the second PEX device may query a forwarding table (i.e., the forwarding table maintained by the second PEX device) with the destination MAC address of the data packet to determine a third interface corresponding to the destination MAC address, and transmit the data packet to a host via the third interface.

In an example, since a correspondence between the MAC address of the host connected with the second PEX device and the third interface is recorded in the forwarding table of the second PEX device, the second PEX device may determine the third interface corresponding to the destination MAC address of the data packet when querying the forwarding table with the destination MAC address.

In an example, the data packet may be from another host, or a CB device, or another PEX device. After receiving a data packet from another host, the second PEX device may query the forwarding table with the destination MAC address of the data packet to determine the third interface corresponding to the destination MAC address, and then transmit the data packet to a corresponding host via the third interface without transmitting the data packet to the CB device. After receiving a data packet from the CB device (i.e., the first data packet transmitted by the CB device to the second PEX device at block 102), the second PEX device may query the forwarding table with the destination MAC address of the data packet to determine the third interface corresponding to the destination MAC address, and then transmit the data packet to a corresponding host via the third interface. After receiving a data packet from another PEX device, the second PEX device may query the forwarding table with the destination MAC address of the data packet to determine the third interface corresponding to the destination MAC address, and then transmit the data packet to a corresponding host via the third interface In an example, the CB device may also transmit a first entry to the first PEX device after transmitting the first data packet to the second PEX device, where the first entry includes a correspondence between a destination MAC address (i.e., the destination MAC address of the first data packet) and the identifier of the second PEX device. The first PEX device may receive the first entry from the CB device and locally store the first entry. After receiving a second data packet from the host, the first PEX device may query the first entry with the destination MAC address of the second data packet to determine the identifier corresponding to the destination MAC address, add the identifier to the second data packet and transmit the modified second data packet to the CB device. After receiving the second data packet transmitted from the first PEX device, the CB device may query the forwarding table with the identifier of the second PEX device carried in the second data packet to determine the first interface corresponding to the identifier of the second PEX device, and transmit the second data packet via the first interface, thereby transmitting the second data packet to the second PEX device. In such a manner, the CB device does not need to maintain a new entry on the hardware chip.

In an example, after transmitting the first data packet to the second PEX device, the CB device may also transmit a correspondence between a destination MAC address (i.e., the destination MAC address of the first data packet) and the identifier of the second PEX device to the first PEX device. After receiving the correspondence, the first PEX device may obtain a second interface of the first PEX device that is connected with the second PEX device and generate a second entry including the destination MAC address and the second interface. After receiving a second data packet from the host, the second PEX device may query the second entry with the destination MAC address of the second data packet to determine the second interface corresponding to the destination MAC address, and then transmit the second data packet to the second PEX device via the second interface without transmitting the second data packet to the CB device.

In an example, after transmitting the first data packet to the second PEX device, the CB device may also add a destination MAC address (i.e., the destination MAC address of the first data packet) to the forwarding table to record a correspondence between the destination MAC address, the identifier of the second PEX device and the first interface corresponding to the identifier. After receiving a second data packet from the host, the first PEX device may transmit the second data packet to the CB device. After receiving the second data packet from the first PEX device, the CB device may query the forwarding table with the destination MAC address of the second data packet to determine the first interface corresponding to the destination MAC address, and then transmit the second data packet to the second PEX device via the first interface. In such a manner, the CB device does not need to maintain a new entry, i.e., the above-mentioned correspondence between the destination MAC address and the first interface, on the hardware chip.

Based on the above technical solutions, in an example of the present disclosure, all forwarding entries may not be maintained on a CB device and some forwarding entries may also be maintained on a PEX device so that the entry resources of the PEX device may be fully utilized. Thus, the number of entries maintained by the CB device may be reduced and the entry resources of the CB device may be saved. Also, a PEX device may transmit a packet based on a local forwarding entry without transmitting all packets to the CB device for processing. As a result, the number of packets to be processed by the CB device can be reduced, thereby lowering the requirement for the performance of the CB device and saving the processing resources of the CB device, and reducing the forwarding stress of the CB device.

Figure 3:
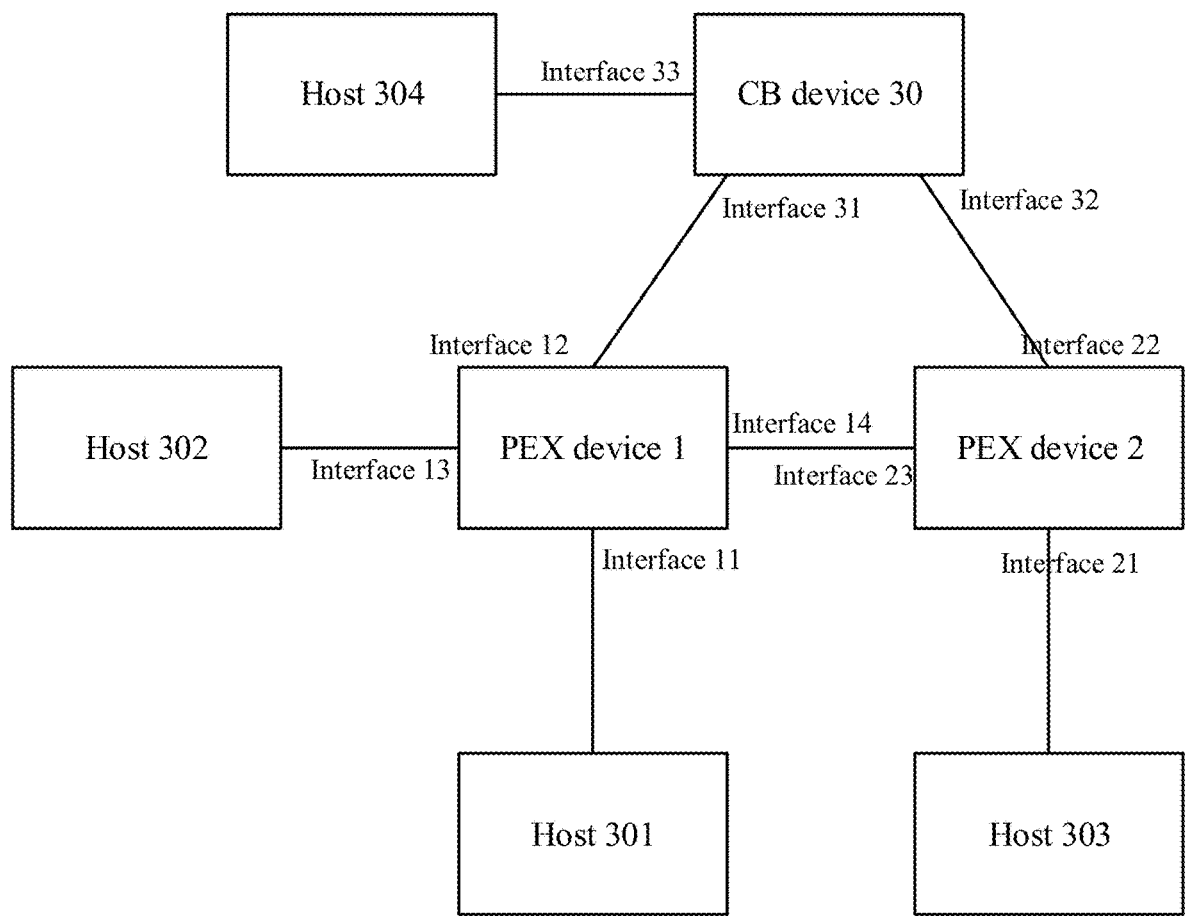
FIG. 3 illustrates a schematic diagram of an application scenario according to an example of the present disclosure.

The above process is to be described in detail below in connection with an application scenario shown in FIG. 3. In this application scenario, the longitudinally stacked network may include, but is not limited to, a CB device 30, a PEX device 1, a PEX device 2, a host 301, a host 302, a host 303, and a host 304, and a connection relationship of all the devices may be as shown in FIG. 3.

In an example, the longitudinally stacked network may be applied to a Virtual eXtensible LAN (VXLAN), and the CB device 30, the PEX device 1 and the PEX device 2 together achieve functions of a VXLAN Tunnel End Point (VTEP) device. Moreover, each of the host 301, the host 302, the host 303 and the host 304 may be a Virtual Machine (VM).

In an example, the CB device 30 may assign identifiers for the PEX device 1 and the PEX device 2, respectively. For example, the CB device 30 may assign a virtual MAC address 1-1-1 for the PEX device 1, and assign a virtual MAC address 2-2-2 for the PEX device 2. Then, the CB device 30 may record a correspondence between the virtual MAC address 1-1-1 and an interface 31 (i.e., the first interface) and a correspondence between the virtual MAC address 2-2-2 and an interface 32 (i.e., the first interface) in the forwarding table, as shown in table 1.

TABLE 1

| Virtual MAC Address | Egress Interface |
|---|---|
| 1-1-1 | Interface 31 |
| 2-2-2 | Interface 32 |

In this application scenario, the description is made by taking the host 304, the host 302 and the host 303 transmitting data packets to the host 301 for example. Thus, the PEX device 1 may be a second PEX device, and PEX device 2 may be a first PEX device.

In an example, after learning the MAC address A-A-A of the host 301, the PEX device 1 may record a correspondence between the MAC address A-A-A and an interface 11 (the third interface) in the forwarding table, as shown in table 2. The host 301 may initiatively transmit an ARP packet, and after receiving the ARP packet, the PEX device 1 may learn the MAC address A-A-A of the host 301 from the ARP packet.

TABLE 2

| MAC Address | Egress Interface |
|---|---|
| A-A-A | Interface 11 |

Further, after learning the MAC address A-A-A of the host 301, the PEX device 1 may also generate a protocol packet including the MAC address A-A-A and transmit the protocol packet to the CB device 30. After receiving the protocol packet from the PEX device 1, the CB device 30 may record a correspondence between the MAC address A-A-A and the virtual MAC address 1-1-1 of the PEX device 1 in a mapping table, as shown in table 3.

TABLE 3

| MAC address | Virtual MAC Address |
|---|---|
| A-A-A | 1-1-1 |

On the basis of the above process, transmitting a data packet according to an example of the present disclosure may include the following cases.

In a first case, the host 302 may transmit a data packet to the host 301, where destination MAC address of the data packet may be A-A-A. Other fields of the data packet will not be described herein.

After receiving the data packet transmitted by the host 302 to the host 301, the PEX device 1 may query the forwarding table shown in table 2 with the destination MAC address A-A-A of the data packet to determine the interface 11 corresponding to the destination MAC address A-A-A and transmit the data packet to the host 1 via the interface 11.

In a second case, the host 304 may transmit a data packet to the host 301, where destination MAC address of the data packet may be A-A-A. Other fields of the data packet will not be described herein.

After receiving a data packet first transmitted by the host 304 to the host 301 (hereinafter referred to as a first data packet), the CB device 30 may query the mapping table shown in table 3 with the destination MAC address A-A-A of the first data packet to determine the virtual MAC address 1-1-1 corresponding to the destination MAC address A-A-A. Then, the CB device 30 may query the forwarding table shown in table 1 with the virtual MAC address 1-1-1 to determine the interface 31. Then, the CB device 30 may transmit the first data packet to the PEX device 1 via the interface 31.

After receiving the first data packet from the CB device 30, the PEX device 1 may query the forwarding table shown in table 2 with the destination MAC address A-A-A of the first data packet to determine the interface 11 corresponding to the destination MAC address A-A-A and transmit the first data packet to the host 301 via the interface 11.

In an example, the CB device 30 may also record a correspondence between the destination MAC address A-A-A and the interface 31 in the forwarding table, as shown in table 4, after transmitting the first data packet to the PEX device 1 via the interface 31. Thus, when receiving a data packet second or later transmitted by the host 304 to the host 301 (hereinafter referred to as a second data packet), the CB device 30 may query the forwarding table shown in table 4 with the destination MAC address A-A-A of the second data packet to determine the interface 31. Then, the CB device 30 may transmit the second data packet to the PEX device 1 via the interface 31.

TABLE 4

| MAC Address | Egress Interface |
| --- | --- |
| A-A-A | Interface 31 |

After receiving the second data packet from the CB device 30, the PEX device 1 may query the forwarding table shown in table 2 with the destination MAC address A-A-A of the second data packet to determine the interface 11 corresponding to the destination MAC address A-A-A, and then transmit the second data packet to the host 401 via the interface 11.

In an example, the reason why the first data packet and the second data packet are processed in different manners may be that: the above forwarding table is maintained on a hardware chip and in a memory, while the above mapping table is only maintained in the memory. Therefore, after receiving the first data packet, the hardware chip of the CB device cannot directly forward the first data packet based on the forwarding table but is to transmit the first data packet to a Central Processing Unit (CPU). The CPU may then transmit the first data packet to the PEX device 1 by utilizing the mapping table and the forwarding table and distribute the forwarding entry shown in table 4 on the hardware chip. Then the hardware chip of the CB device may forward the second data packet based on the forwarding entry shown in table 4 after receiving the second data packet.

In a third case, the host 303 may transmit a data packet to the host 301, where destination MAC address of the data packet may be A-A-A. Other fields of the data packet will not be described herein.

After receiving a data packet first transmitted by the host 303 to the host 301 (hereinafter referred to as a first data packet), the PEX device 2 may transmit the first data packet to the CB device 30. After receiving the first data packet, the CB device 30 may query the mapping table shown in table 3 with the destination MAC address A-A-A of the first data packet to determine the virtual MAC address 1-1-1 corresponding to the destination MAC address A-A-A. Then, the CB device 30 may query the forwarding table shown in table 1 with the virtual MAC address 1-1-1 to determine the interface 31. Then the CB device 30 may transmit the first data packet to the PEX device 1 via the interface 31. Furthermore, after receiving the first data packet from the CB device 30, the PEX device 1 may query the forwarding table shown in table 2 with the destination MAC address A-A-A of the first data packet to determine the interface 11 corresponding to the destination MAC address A-A-A, and then transmit the first data packet to the host 301 via the interface 11.

In an example, after transmitting the first data packet to the PEX device 1 via the interface 31, the CB device 30 may also transmit a first entry to the PEX device 2. The PEX device 2 may then locally store the first entry (e.g., store the first entry on the hardware chip of the PEX device 2), where the first entry may include a correspondence between the destination MAC address A-A-A and the virtual MAC address 1-1-1.

When receiving a data packet second or later transmitted by the host 303 to the host 301 (hereinafter referred to as a second data packet), the PEX device 2 may query the first entry with the destination MAC address A-A-A of the second data packet to determine the virtual MAC address 1-1-1 corresponding to the destination MAC address A-A-A, and add the virtual MAC address 1-1-1 to the second data packet and then transmit the modified second data packet to the CB device 30. After receiving the second data packet, the CB device 30 may query the forwarding table shown in table 1 with the virtual MAC address 1-1-1 carried in the second data packet to determine the interface 31. Then, the CB device 30 may transmit the second data packet to the PEX device 1 via the interface 31. Moreover, after receiving the second data packet from the CB device 30, the PEX device 1 may query the forwarding table shown in table 2 with the destination MAC address A-A-A of the second data packet to determine the interface 11 corresponding to the destination MAC address A-A-A, and then transmit the second data packet to the host 301 via the interface 11.

In a fourth case, the host 303 may transmit a data packet to the host 301, where destination MAC address of the data packet may be A-A-A. Other fields of the data packet will not be described herein.

According to an example of the present disclosure, a link between PEX devices may be added to a longitudinally stacked network. As shown in FIG. 3, a link between the PEX device 1 and the PEX device 2 may be added. In this application scenario, the process of transmitting a data packet may be as shown below.

After receiving a data packet first transmitted by the host 303 to the host 301 (hereinafter referred to as a first data packet), the PEX device 2 may transmit the first data packet to the CB device 30. After receiving the first data packet, the CB device 30 may query the mapping table shown in table 3 with the destination MAC address A-A-A of the first data packet to determine the virtual MAC address 1-1-1 corresponding to the destination MAC address A-A-A. Then, the CB device 30 may query the forwarding table shown in table 1 with the virtual MAC address 1-1-1 to determine the interface 31. Then the CB device 30 may transmit the first data packet to the PEX device 1 via the interface 31. Moreover, after receiving the first data packet from the CB device 30, the PEX device 1 may query the forwarding table shown in table 2 with the destination MAC address A-A-A of the first data packet to determine the interface 11 corresponding to the destination MAC address A-A-A, and then transmit the first data packet to the host 301 via the interface 11.

In an example, the CB device 30 may also transmit the correspondence between the destination MAC address A-A-A and the PEX device 1 to the PEX device 2 after transmitting the first data packet to the PEX device 1 via the interface 31. After receiving the correspondence between the destination MAC address A-A-A and the PEX device 1, the PEX device 2 may obtain an interface 23 of the PEX device 2 that is connected with the PEX device 1 and store a second entry (e.g., store the second entry on the hardware chip of the PEX device 2), where the second entry may include a correspondence between the destination MAC address A-A-A and the interface 23. When receiving a data packet second or later transmitted by the host 303 to the host 301 (hereinafter referred to as a second data packet), the PEX device 2 may query the second entry with the destination MAC address A-A-A of the second data packet to determine the interface 23 corresponding to the destination MAC address A-A-A, and then transmit the second data packet to the PEX device 1 via the interface 23. After receiving the second data packet from the PEX device 2, the PEX device 1 may query the forwarding table shown in table 2 with the destination MAC address A-A-A of the second data packet to determine the interface 11 corresponding to the destination MAC address A-A-A, and transmit the second data packet to the host 301 via the interface 11.

In a fifth case, the host 303 may transmit a data packet to the host 301, where destination MAC address of the data packet may be A-A-A. Other fields of the data packet will not be described herein.

After receiving a data packet first transmitted by the host 303 to the host 301 (hereinafter referred to as a first data packet), the PEX device 2 may transmit the first data packet to the CB device 30. After receiving the first data packet, the CB device 30 may query the mapping table shown in table 3 with the destination MAC address A-A-A of the first data packet to determine the virtual MAC address 1-1-1 corresponding to the destination MAC address A-A-A. Then, the CB device 30 may query the forwarding table shown in table 1 with the virtual MAC address 1-1-1 to determine the interface 31. Then the CB device 30 may transmit the first data packet to the PEX device 1 via the interface 31. Moreover, after receiving the first data packet from the CB device 30, the PEX device 1 may query the forwarding table shown in table 2 with the destination MAC address A-A-A of the first data packet to determine the interface 11 corresponding to the destination MAC address A-A-A, and then transmit the first data packet to the host 301 via the interface 11.

In an example, the CB device 30 may also record the correspondence between the destination MAC address A-A-A and the interface 31 in the forwarding table, as shown above in table 4, after transmitting the first data packet to the PEX device 1 via the interface 31. When receiving a data packet second or later transmitted by the host 303 to the host 301 (hereinafter referred to as a second data packet), the PEX device 2 may transmit the second data packet to the CB device 30. After receiving the second data packet, the CB device 30 may query the forwarding table shown in table 4 with the destination MAC address A-A-A of the second data packet to determine the interface 31. Then, the CB device 30 may transmit the second data packet to the PEX device 1 via the interface 31. Moreover, after receiving the second data packet from the CB device 30, the PEX device 1 may query the forwarding table shown in table 2 with the destination MAC address A-A-A of the second data packet to determine the interface 11 corresponding to the destination MAC address A-A-A, and then transmit the second data packet to the host 301 via the interface 11.

Based on the above technical solutions, in an example of the present disclosure, all forwarding entries may not be maintained on a CB device and some forwarding entries may also be maintained on a PEX device so that the entry resources of the PEX device may be fully utilized. Thus, the number of entries maintained by the CB device may be reduced and the entry resources of the CB device may be saved. Also, a PEX device may transmit a packet based on a local forwarding entry without transmitting all packets to the CB device for processing. As a result, the number of packets to be processed by the CB device can be reduced, thereby lowering the requirement on the performance of the CB device, saving the processing resources of the CB device, and reducing the forwarding stress of the CB device.

Figure 4:
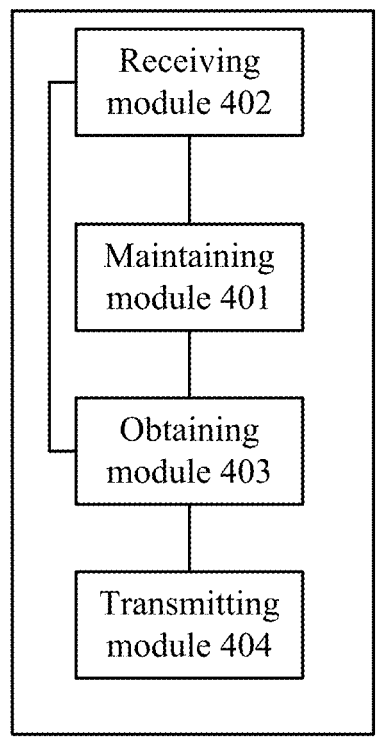
FIG. 4 illustrates a structure diagram of a CB device according to an example of the present disclosure.

FIG. 4 illustrates a structure diagram of a CB device according to an example of the present disclosure, the CB device specifically includes:

a maintaining module 401 configured to maintain a mapping entry representing a correspondence between a Port Extender (PEX) device and a Media Access Control (MAC) address of a host connected with the PEX device in a mapping table;

a receiving module 402 configured to receive a first data packet transmitted by a first PEX device;

an obtaining module 403 configured to determine a mapping entry in which the MAC address of the host matches a destination MAC address of the first data packet by querying the mapping table; and a transmitting module 404 configured to transmit the first data packet to a second PEX device in the determined mapping entry.

The maintaining module 401 is specifically configured to: receive a protocol packet transmitted by a PEX device in the process of maintaining the mapping entry representing the correspondence between the PEX device and the MAC address of the host connected with the PEX device in the mapping table, where the protocol packet carries the MAC address of the host that is learnt by the PEX device; and record a correspondence between an identifier of the PEX device and the MAC address of the host as the mapping entry in the mapping table, wherein the identifier is assigned by the CB device for the PEX device.

In an example, the maintaining module 401 is also configured to record a forwarding entry representing a correspondence between the identifier of each PEX device connected to the CB device and a first interface of the CB device that is connected to the PEX device in a forwarding table.

In an example, the transmitting module 404 is specifically configured to query the forwarding table with the identifier of the second PEX device to determine the first interface corresponding to the identifier and transmit the first data packet via the first interface in the process of transmitting the first data packet to the second PEX device.

The transmitting module 504 is also configured to transmit a first entry to the first PEX device, where the first entry includes a correspondence between the destination MAC address of the first data packet and the identifier of the second PEX device. The receiving module 402 is also configured to receive a second data packet from the first PEX device, where the destination MAC address of the second data packet is the same as the destination MAC address of the first data packet and carries the identifier of the second PEX device obtained according to the first entry. The obtaining module 403 is also configured to query the forwarding table with the identifier of the second PEX device carried in the second data packet to determine the first interface corresponding to the identifier of the second PEX device. The transmitting module 404 is also configured to transmit the second data packet via the first interface; or the maintaining module 401 is also configured to add the destination MAC address of the first data packet to the forwarding entry recording the correspondence between the identifier of the second PEX device and the first interface of the CB device that is connected to the second PEX device, so as to record a correspondence among the destination MAC address of the first data packet, the identifier of the second PEX device and the first interface. The receiving module 402 is also configured to receive a second data packet from the first PEX device, where the destination MAC address of the second data packet is the same as the destination MAC address of the first data packet. The obtaining module 403 is also configured to query the forwarding table with the destination MAC address of the second data packet to determine the first interface corresponding to the destination MAC address. The transmitting module 404 is also configured to transmit the second data packet via the first interface.

Different modules of the device in the present disclosure may be integrated together, or deployed separately. The above modules may be combined into one module, and may also be further split into a plurality of submodules.

Figure 5:
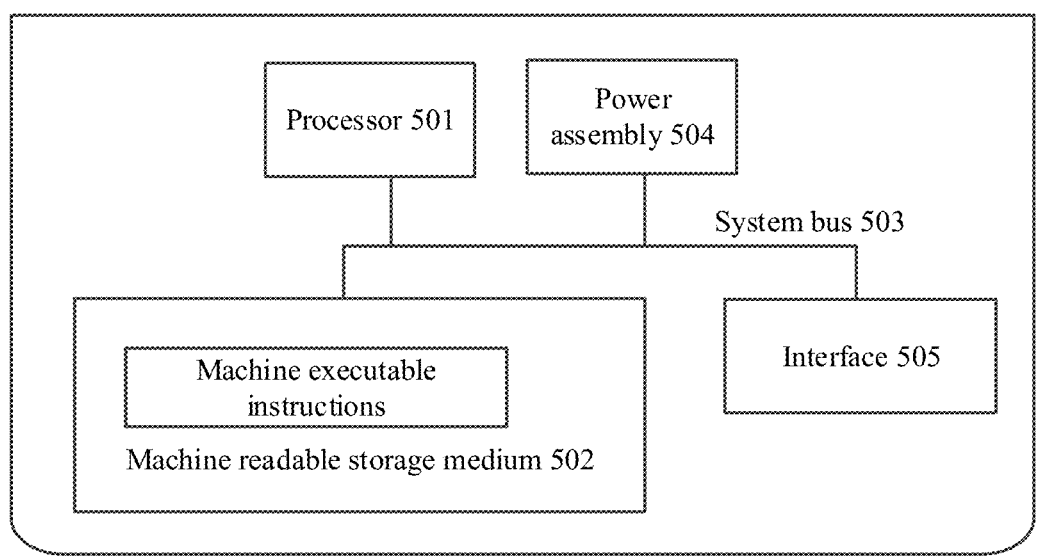
FIG. 5 illustrates a structure diagram of a CB device according to another example of the present disclosure.

FIG. 5 illustrates another structure diagram of a CB device according to an example of the present disclosure. The CB device includes: a processor 501, and a machine-readable storage medium 502 that stores machine-executable instructions. The processor 501 may communicate with the machine-readable storage medium 502 via a system bus 503. Also, the processor 501 may execute the above method of transmitting a packet by reading and executing the machine-executable instructions corresponding to a control logic of transmitting a packet on the machine-readable storage medium 502. As shown in FIG. 5, the hardware structure may also include a power assembly 504 configured to perform power management on the CB device. It should be noted that, an interface 505 in FIG. 5 is illustrative, and in implementations, the hardware structure may include multiple interfaces 505 configured to connect the CB device to other CB devices or port extender devices, or configured to connect the CB device to a network, and so on.

The machine-readable storage medium 502 mentioned herein may be any electronic, magnetic, optical or other physical storage device, and may contain or store information, such as executable instructions, data and the like. For example, the machine-readable storage medium may be a Random Access Memory (RAM), a volatile memory, a nonvolatile memory, a flash memory, a storage drive (e.g., hard disk drive), a solid state disk, or any type of storage disk.

The machine-readable storage medium 502 is configured to store machine-executable instructions corresponding to a control logic of transmitting a packet. The machine-executable instructions include program instructions run by the maintaining module 401, program instructions run by the receiving module 402, program instructions run by the obtaining module 403, and program instructions run by the transmitting module 404.

For example, when reading and executing the machine-executable instructions on the machine-readable storage medium 502, the processor 501 is caused to:

maintain a mapping entry representing a correspondence between a Port Extender (PEX) device and a Media Access Control (MAC) address of a host connected with the PEX device in a mapping table;

receive a first data packet from a first PEX device;

determine a mapping entry in which the MAC address of the host matches a destination MAC address of the first data packet by querying the mapping table; and transmit the first data packet to a second PEX device in the determined mapping entry.

In an example, when maintaining the mapping entry representing the correspondence between a PEX device and the MAC address of the host connected with the PEX device in the mapping table, the processor 501 is also caused by the machine-executable instructions to:

receive a protocol packet from the PEX device, where the protocol packet carries the MAC address of the host that is learnt by the PEX device; and record a correspondence between an identifier of the PEX device and the MAC address of the host as the mapping entry in the mapping table, where the identifier is assigned by the CB device for the PEX device.

In an example, the processor 501 is also caused by the machine-executable instructions to:

record a forwarding entry representing a correspondence between the identifier of each PEX device and a first interface of the CB device that is connected to the PEX device in a forwarding table.

In an example, when transmitting the first data packet to the second PEX device, the processor 501 is also caused by the machine-executable instructions to:

query the forwarding table based on the identifier of the second PEX device to determine the first interface corresponding to the identifier; and transmit the first data packet via the first interface; or transmit a first entry to the first PEX device, where the first entry includes a correspondence between the destination MAC address of the first data packet and the identifier of the second PEX device;

receive a second data packet from the first PEX device, where the destination MAC address of the second data packet is the same as the destination MAC address of the first data packet and carries the identifier of the second PEX device obtained according to the first entry; query the forwarding table with the identifier of the second PEX device carried in the second data packet to determine the first interface corresponding to the identifier of the second PEX device; and transmit the second data packet via the first interface.

In an example, the processor 501 is also caused by the machine-executable instructions to:

add the destination MAC address of the first data packet to the forwarding entry recording the correspondence between the identifier of the second PEX device and the first interface of the CB device that is connected to the second PEX device, so as to record a correspondence among the destination MAC address of the first data packet, the identifier of the second PEX device and the first interface;

receive a second data packet from the first PEX device, where the destination MAC address of the second data packet is the same as the destination MAC address of the first data packet;

query the forwarding table with the destination MAC address of the second data packet to determine the first interface corresponding to the destination MAC address; and transmit the second data packet via the first interface.

Figure 6:
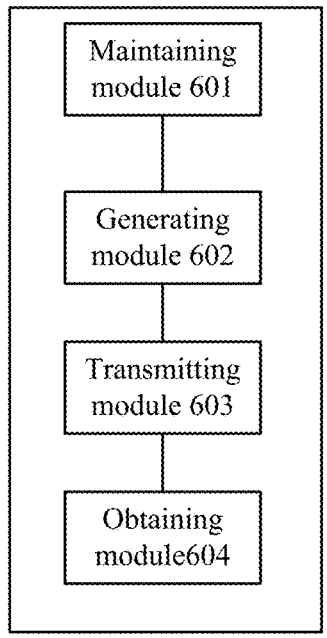
FIG. 6 illustrates a structure diagram of a PEX device according to an example of the present disclosure.

FIG. 6 illustrates a structure diagram of a PEX device according to an example of the present disclosure. The device specifically includes:

a maintaining module 601 configured to, after learning the MAC address of a host connected with the PEX device, record a forwarding entry representing a correspondence between the MAC address of the host and a third interface in a forwarding table, where the third interface is an interface of the PEX device that is connected with the host;

a generating module 602 configured to generate a protocol packet carrying the MAC address;

a transmitting module 603 configured to transmit the protocol packet to a Controlling Bridge (CB) device, so that the CB device maintains a mapping entry representing a correspondence between the MAC address of the host and the PEX device in a mapping table;

an obtaining module 604 configured to query the forwarding table with a destination MAC address of a data packet after receiving the data packet to determine the third interface corresponding to the destination MAC address, where the data packet is from another host, or a CB device, or another PEX device; and a transmitting module 603 configured to transmit the data packet to the host via the third interface.

In an example, the PEX device may also include: a receiving module (not illustrated in the figure).

The receiving module is configured to receive a first entry from the CB device, where the first entry includes a correspondence between a destination MAC address of a data packet and an identifier of another PEX device. The obtaining module 604 is also configured to determine a PEX device identifier corresponding to a destination MAC address of a data packet by querying the first entry after receiving the data packet from the host. The transmitting module 603 is also configured to add the determined PEX device identifier to the data packet and transmit the data packet with the PEX device identifier to the CB device.

Alternatively, the receiving module is configured to receive a first entry from the CB device, where the first entry includes a correspondence between a destination MAC address of a data packet and an identifier of another PEX device. The generating module 602 is also configured to obtain a second interface of the PEX device that is connected with the other PEX device and generate a second entry including the destination MAC address of the data packet and the second interface. The obtaining module 604 is also configured to determine a second interface corresponding to the destination MAC address of a data packet by querying the second entry after receiving the data packet from the host. The transmitting module 23 is also configured to transmit the data packet via the second interface.

Different modules of the device in the present disclosure may be integrated together, or deployed separately. The above modules may be combined into one module, and may also be further split into a plurality of submodules.

Figure 7:
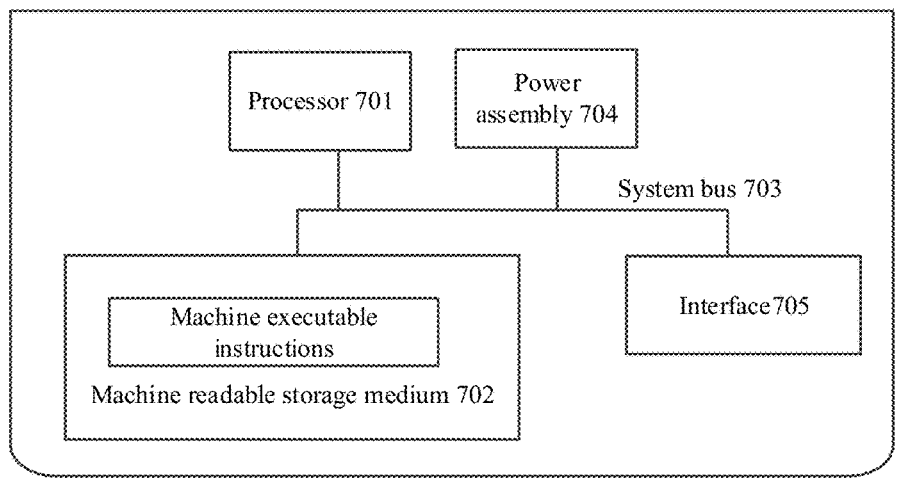
FIG. 7 illustrates a structure diagram of a PEX device according to another example of the present disclosure.

FIG. 7 illustrates another structure diagram of a PEX device according to an example of the present disclosure. The PEX device includes: a processor 701, and a machine-readable storage medium 702 that stores machine-executable instructions. The processor 701 may communicate with the machine-readable storage medium 702 via a system bus 703. Also, the processor 701 may execute the above method of transmitting a packet by reading and executing the machine-executable instructions corresponding to a control logic of transmitting a packet on the machine-readable storage medium 702. As shown in FIG. 7, the hardware structure may also include a power assembly 704 configured to perform power management on the PEX device. It should be noted that, an interface 705 in FIG. 7 is illustrative, and in implementations, the hardware structure may include multiple interfaces 705 configured to connect the PEX device to other CB devices or PEX devices, or configured to connect the PEX device to a network, and so on.

The machine-readable storage medium 702 mentioned herein may be any electronic, magnetic, optical or other physical storage device, and may contain or store information, such as executable instructions, data and the like. For example, the machine-readable storage medium may be a Random Access Memory (RAM), a volatile memory, a nonvolatile memory, a flash memory, a storage drive (e.g., hard disk drive), a solid state disk, or any type of storage disk.

The machine-readable storage medium 702 is configured to store machine-executable instructions corresponding to a control logic of transmitting a packet. The machine-executable instructions include program instructions run by the maintaining module 601, program instructions run by the generating module 602, program instructions run by the transmitting module 603, and program instructions run by the obtaining module 604.

For example, when reading and executing the machine-executable instructions on the machine-readable storage medium 702, the processor 701 is caused to:

learn a Media Access Control address of a host connected with the PEX device;

record a forwarding entry representing a correspondence between the MAC address of the host and a third interface in a forwarding table, where the third interface is an interface of the PEX device that is connected with the host;

generate a protocol packet carrying the MAC address and transmit the protocol packet to a Controlling Bridge (CB) device, so that the CB device maintains a mapping entry representing a correspondence between the MAC address of the host and the PEX device in a mapping table;

query the forwarding table with a destination MAC address of a data packet after receiving the data packet to determine a third interface corresponding to the destination MAC address, where the data packet is from another host, or a CB device, or another PEX device; and transmit the data packet to the host via the third interface.

In an example, the processor 701 is also caused by the machine-executable instructions to:

receive a first entry from the CB device, where the first entry includes a correspondence between a destination MAC address of a data packet and an identifier of another PEX device;

determine a PEX device identifier corresponding to a destination address of a data packet by querying the first entry after receiving the data packet from the host; and add the determined PEX device identifier to the data packet and transmit the data packet with the PEX device identifier to the CB device.

In an example, the processor 701 is also caused by the machine-executable instructions to:

receive a first entry from the CB device, where the first entry includes a correspondence between a destination MAC address of a data packet and an identifier of another PEX device;

obtain a second interface of the PEX device that is connected with the other PEX device and generate a second entry including the destination MAC address of the data packet and the second interface;

determine the second interface corresponding to the destination MAC address of the data packet by querying the second entry after receiving the data packet from the host; and transmit the data packet via the second interface.

Based on the above technical solutions, in an example of the present disclosure, all forwarding entries may not be maintained on a CB device and some forwarding entries may be also maintained on a PEX device so that the entry resources of the PEX device may be fully utilized. Thus, the number of entries maintained by the CB device can be reduced and the entry resources of the CB device can be saved. Also, a PEX device may transmit a packet based on a local forwarding entry without transmitting all packets to the CB device for processing. As a result, the number of packets to be processed by the CB device can be reduced, thereby lowering requirement for the performance of the CB device, saving the processing resources of the CB device, and reducing the forwarding stress of the CB device.

From the foregoing descriptions of the examples, those of skill in the art may clearly appreciate that the present disclosure may be implemented by means of software and necessary universal hardware platform, or by hardware. However, the former may be preferred in many cases. Based on such an understanding, the technical solutions of the present disclosure may be embodied in essence or in part contributing to the prior art in the form of a software product, and the computer product may be stored on a storage medium and include a plurality of instructions used to cause a computer device (which may be a personal computer, a server, a network device, or the like) to execute the method according to each example of the present disclosure. Further, those of skill in the art may understand that the accompanying drawings are just illustrations of one preferred example, and the modules or flows in the drawings may not be necessarily required to implement the present disclosure.

Those of skill in the art may understand that the modules in the device of an example may be distributed in the device of the example as described in the example, and may also changed accordingly to be located in one or more devices different from that example. The modules of the above example may be combined into one module, and may also be further split into a plurality of submodules. The serial numbers of the above examples of the present disclosure are merely for the purpose of description and do not represent whether the examples are good or bad.

The above are detailed description of a method and a device provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of transmitting a packet, comprising:
maintaining, by a Controlling Bridge (CB) device, a mapping entry representing a correspondence between a Port Extender (PEX) device and a Media Access Control (MAC) address of a host connected with the PEX device in a mapping table;
receiving, by the CB device, a first data packet from a first PEX device;
determining, by the CB device, a mapping entry in which the MAC address of the host matches a destination MAC address of the first data packet by querying the mapping table; and
transmitting, by the CB device, the first data packet to a second PEX device in the determined mapping entry,
wherein maintaining the mapping entry representing the correspondence between the PEX device and the MAC address of the host connected with the PEX device in the mapping table comprises:
receiving, by the CB device, a protocol packet from the PEX device, wherein the protocol packet carries the MAC address of the host that is learnt by the PEX device; and
recording, by the CB device, a correspondence between an identifier of the PEX device and the MAC address of the host as a mapping entry in the mapping table, wherein the identifier is assigned by the CB device for the PEX device.

2. The method according to claim 1, further comprising:
recording, by the CB device, a forwarding entry representing a correspondence between the identifier of each PEX device connected to the CB device and a first interface of the CB device that is connected to the PEX device, in a forwarding table.

3. The method according to claim 2, wherein transmitting the first data packet to the second PEX device comprises:

querying, by the CB device, the forwarding table based on the identifier of the second PEX device to determine the first interface corresponding to the identifier; and
transmitting, by the CB device, the first data packet via the first interface.

4. The method according to claim 2, further comprising:
transmitting, by the CB device, a first entry to the first PEX device, wherein the first entry comprises a correspondence between the destination MAC address of the first data packet and the identifier of the second PEX device;
receiving, by the CB device, a second data packet from the first PEX device, wherein the destination MAC address of the second data packet is the same as the destination MAC address of the first data packet and carries the identifier of the second PEX device obtained according to the first entry;
querying, by the CB device, the forwarding table with the identifier of the second PEX device carried in the second data packet to determine the first interface corresponding to the identifier of the second PEX device; and
transmitting, by the CB device, the second data packet via the first interface.

5. The method according to claim 2, further comprising:
adding, by the CB device, the destination MAC address of the first data packet to the forwarding entry recording the correspondence between the identifier of the second PEX device and the first interface of the CB device that is connected to the second PEX device, so as to record a correspondence among the destination MAC address of the first data packet, the identifier of the second PEX device and the first interface;
receiving, by the CB device, a second data packet from the first PEX device, wherein the destination MAC address of the second data packet is the same as the destination MAC address of the first data packet;
querying, by the CB device, the forwarding table with the destination MAC address of the second data packet to determine the first interface corresponding to the destination MAC address; and
transmitting, by the CB device, the second data packet via the first interface.

6. A method of transmitting a packet, comprising:
learning, by a Port Extender (PEX) device, a Media Access Control (MAC) address of a host connected with the PEX device;
recording, by the PEX device, a forwarding entry representing a correspondence between the MAC address of the host and a third interface in a forwarding table, wherein the third interface is an interface of the PEX device that is connected with the host;
generating, by the PEX device, a protocol packet carrying the MAC address and transmitting the protocol packet to a Controlling Bridge (CB) device, so that the CB device maintains a mapping entry representing a correspondence between the MAC address of the host and the PEX device in a mapping table;
querying, by the PEX device, the forwarding table with a destination MAC address of a data packet after receiving the data packet to determine a third interface corresponding to the destination MAC address, wherein the data packet is from another host, or the CB device, or another PEX device; and
transmitting, by the PEX device, the data packet to the host via the third interface.

7. The method according to claim 6, further comprising:
receiving, by the PEX device, a first entry from the CB device, wherein the first entry comprises a correspondence between a destination MAC address of a data packet and an identifier of another PEX device;
determining, by the PEX device, a PEX device identifier corresponding to a destination MAC address of a data packet by querying the first entry after receiving the data packet from the host; and
adding, by the PEX device, the determined PEX device identifier to the data packet and transmitting the data packet with the PEX device identifier to the CB device.

8. The method according to claim 6, further comprising:
receiving, by the PEX device, a first entry from the CB device, wherein the first entry comprises a correspondence between a destination MAC address of a data packet and an identifier of another PEX device;
obtaining, by the PEX device, a second interface of the PEX device that is connected with the other PEX device and generating a second entry comprising the destination MAC address of the data packet and the second interface;
determining, by the PEX device, a second interface corresponding to a destination MAC address of a data packet by querying the second entry after receiving the data packet from the host; and
transmitting, by the PEX device, the data packet via the second interface.

9. A Controlling Bridge (CB) device, comprising:
a processor; and
a non-transitory machine-readable storage medium that stores machine-executable instructions, wherein by reading and executing the machine-executable instructions, the processor is caused to:
maintain a mapping entry representing a correspondence between a Port Extender (PEX) device and a Media Access Control (MAC) address of a host connected with the PEX device in a mapping table;
receive a first data packet transmitted by a first PEX device;
determine a mapping entry in which the MAC address of the host matches a destination MAC address of the first data packet by querying the mapping table; and
transmit the first data packet to a second PEX device in the determined mapping entry,
wherein when maintaining the mapping entry representing the correspondence between the PEX device and the MAC address of the host connected with the PEX device in the mapping table, the processor is further caused by the machine-executable instructions to:
receive a protocol packet from the PEX device, wherein the protocol packet carries the MAC address of the host that is learnt by the PEX device; and
record a correspondence between an identifier of the PEX device and the MAC address of the host as a mapping entry in the mapping table, wherein the identifier is assigned by the CB device for the PEX device.

10. The CB device according to claim 9, wherein the processor is further caused by the machine-executable instructions to:
record a forwarding entry representing a correspondence between the identifier of each PEX device connected to the CB device and a first interface of the CB device that is connected to the PEX device, in a forwarding table.

11. The CB device according to claim 10, wherein when transmitting the first data packet to the second PEX device, the processor is further caused by the machine-executable instructions to:
query the forwarding table based on the identifier of the second PEX device to determine the first interface corresponding to the identifier; and
transmit the first data packet via the first interface; or
transmit a first entry to the first PEX device, wherein the first entry comprises a correspondence between the destination MAC address of the first data packet and the identifier of the second PEX device;
receive a second data packet from the first PEX device, wherein the destination MAC address of the second data packet is the same as the destination MAC address of the first data packet and carries the identifier of the second PEX device obtained according to the first entry;
query the forwarding table with the identifier of the second PEX device carried in the second data packet to determine the first interface corresponding to the identifier of the second PEX device; and
transmit the second data packet via the first interface.

12. The CB device according to claim 10, wherein the processor is further caused by the machine-executable instructions to:
add the destination MAC address of the first data packet to the forwarding entry recording the correspondence between the identifier of the second PEX device and the first interface of the CB device that is connected to the second PEX device, so as to record a correspondence among the destination MAC address of the first data packet, the identifier of the second PEX device and the first interface;
receive a second data packet from the first PEX device, wherein the destination MAC address of the second data packet is the same as the destination MAC address of the first data packet;
query the forwarding table with the destination MAC address of the second data packet to determine the first interface corresponding to the destination MAC address; and transmit the second data packet via the first interface.

* * * * *